United States Patent Office 3,012,946
Patented Dec. 12, 1961

3,012,946
PRODUCTION OF 7-CHLORO-6-DEMETHYL-
TETRACYCLINE
Stephen Aloysius Szumski, Pearl River, N.Y., assignor to American Cyanamid Company, New York, N.Y., a corporation of Maine
No Drawing. Filed Nov. 16, 1960, Ser. No. 69,568
3 Claims. (Cl. 195—80)

This invention relates to an improved process of producing 7-chloro-6-demethyltetracycline by fermentation and to an improved fermentation medium therefor.

A number of tetracyclines have been prepared by fermentation methods using various strains of *Streptomyces aureofaceins*. Depending on the particular strain used various tetracyclines are produced. For example, many strains produce predominantly chlortetracycline. Strain ATCC 12416a and certain other related strains will produce predominantly tetracycline and another strain ATCC 12551 produces 7-chloro-6-demethyltetracycline.

In large scale commercial production of the tetracyclines, foaming present a serious problem. Various triglyceride oils have been used to reduce foam, of which lard oil is typical. The amount of the triglyceride used will vary from about 0.5 to 6 percent by volume and is added sometimes all at once and frequently in successive amounts to maintain a reasonable foam level. This foam reduction has been of great practical importance and the use of triglyceride oils for this purpose is standard in industrial productions.

In Patent No. 2,923,688, issued February 2, 1960, to Szumski and Petty, there is described an improved process for controlling foam and an improved composition in which the triglyceride oil contained various amounts of rice bran oil sludge. This is the sludge that is obtained by filtering crude rice bran oil. It did not appear to be particularly vital what triglyceride was associated with the rice bran oil sludge. It could be rice bran oil itself or lard oil or any of the other commonly used triglycerides. A very great reduction in foaming resulted with lower consumption of oil. Among fermentations in which this process was used were those producing tetracycline and 7-chlorotetracycline. The mechanism by which the rice bran oil sludge increased the defoaming properties of the triglyceride oils was not then known and is still not known. However, its results were very marked and so an improved process of fermentation resulted which, however, was not ideal. Much better operating conditions resulted but for this a price had to be paid, namely a lowered yield or concentration of the tetracycline in the fermentation mash. The lowering was not so great as to offset the marked advantages in improved defoaming but it was nevertheless substantial and constituted the price which had to be paid to obtain the antifoaming improvements of the patent.

The present invention is based on a surprising discovery that when rice bran oil sludge is used in the production of a different type of tetracycline, namely 7-chloro-6-demethyltetracycline, the improved foam control resulted, which might have been expected, but instead of a loss in concentration of the tetracycline the concentration was improved. This completely anomalous behavior with 7-chloro-6-demethyltetracycline fermentations has not as yet been explained and therefore it is not desired to limit the present to any theoretical mechanism. It is quite obvious that there is some different mechanism or some additional mechanism to that which produces defoaming but what this is and why it should produce the reverse effect with 7-chloro-6-demethyltetracycline is at present unknown.

The particular triglyceride with which the rice bran oil sludge is associated does not appear to be a significant factor. Crude rice bran oil containing the sludge may be used or the sludge may be added to other triglycerides such as lard oil or any other triglyceride in a vegetable or animal origin. The amount of oil and rice bran oil sludge may vary from about 0.5 to 6 percent of volume of the fermentation medium; in other words in amounts which do not greatly differ from that useful for defoaming. The upper limit is not as sharp. More oil can be used but ordinarily the improvement beyond 6% is not very great. The relative amount of the rice bran oil sludge should be from 1 to 10 percent of the triglyceride. The rice bran oil sludge settles out from ordinary rice bran oil and greater yields can be obtained by chilling and then filtering. The sludge is a pasty mixture of unknown composition containing about 20 percent waxy material and 80 percent gummy material.

The improvement of the present invention is obtained in various fermentation mixtures so long as they contain triglyceride and rice bran oil sludge and use a mold strain which produces 7-chloro-6-demethyltetracycline.

The invention will be described in greater detail in conjunction with the following specific examples in which the parts are by weight unless otherwise specified.

EXAMPLE 1

Three fermentations were carried out with three different strains of *S. aureofaciens*, the usual one producing chlortetracycline, strain ATCC 12416a to produce tetracycline and strain ATCC 12551 to produce 7-chloro-6-demethyltetracycline. In each case the fermentation was effected in two different media, the basic composition being 30 parts of cottonseed meal, 35 parts of barley flour, 1 part of brewer's yeast, 1 part of ammonium chloride, 0.05 part copper sulphate and water to make up a thousand parts. To the fermentation media there was added oil in the amount of 20 milliliters per liter of medium. The fermentations were accomplished by incubation of the inoculated medium under aerobic conditions at 26.5° C. for 120 hours. The oils added in each pair were respectively crude rice bran oil and filtered rice bran oil. The crude rice bran oil contained a rice bran oil sludge in amounts from 1 to 10 percent of the oil. The results appear in the following table:

Table 1

| State of Rice Bran Oil | Compound Obtained | Assay, mcg./ml. |
|---|---|---|
| unfiltered | 7-chloro-6-demethyltetracycline | 3,900 |
| filtered | do | 3,710 |
| unfiltered | chlortetracycline | 6,050 |
| filtered | do | 6,850 |
| unfiltered | tetracycline | 7,920 |
| filtered | do | 8,230 |

It will be seen that with chlortetracycline and tetracycline the presence of rice bran oil sludge decreased the concentration of material obtained, but with 7-chloro-6-demethyltetracycline there was a substantial increase.

EXAMPLE 2

The fermentation procedure was repeated with only the production of tetracycline as a control. In this case lard oil with and without additional rice bran oil sludge was used. The results appear in the following table.

*Table 2*

| Type of Oil Added | Compound Obtained | Assay, mcg./ml. |
|---|---|---|
| lard oil | 7-chloro-6-demethyltetracycline | 3,240 |
| lard oil plus 2% sludge | do | 3,500 |
| lard oil | tetracycline | 9,990 |
| lard oil plus 3.75% sludge | do | 9,000 |

Again as in Example 1 it is apparent that the presence of rice bran oil sludge decreases the concentration with tetracycline but increases it with 7-chloro-6-demethyltetracycline.

I claim:
1. A process for producing 7-chloro-6-demethyltetracycline which comprises cultivating a 7-chloro-6-demethyltetracycline-producing micro-organism of the genus Streptomyces in an aqueous nutrient medium containing assimilable sources of carbohydrate, nitrogen and inorganic salts under submerged aerobic conditions and in the presence of from 0.5 to 6 percent by volume of a glyceride oil which contains from 1 to 10 percent of rice bran oil sludge, whereby substantial quantities of 7-chloro-6-demethyltetracycline are produced.

2. A process according to claim 1 in which the triglyceride oil is crude rice bran oil.

3. A process according to claim 1 in which the oil is lard oil to which the rice bran oil sludge has been added.

References Cited in the file of this patent
UNITED STATES PATENTS
2,923,688 Szumski et al. _____ Feb. 2, 1960